(12) United States Patent
Hatayama et al.

(10) Patent No.: US 7,946,578 B2
(45) Date of Patent: May 24, 2011

(54) AUTOMATIC ORIGINAL CONVEYING DEVICE AND IMAGE FORMING APPARATUS

(75) Inventors: Kohji Hatayama, Kanagawa (JP); Taku Kudoh, Kanagawa (JP)

(73) Assignee: Ricoh Company Ltd., Toyko (JP)

( * ) Notice: Subject to any disclaimer, the term of this patent is extended or adjusted under 35 U.S.C. 154(b) by 58 days.

(21) Appl. No.: 12/385,392

(22) Filed: Apr. 7, 2009

(65) Prior Publication Data

US 2009/0273134 A1  Nov. 5, 2009

(30) Foreign Application Priority Data

Apr. 30, 2008  (JP) .................................. 2008-118716

(51) Int. Cl.
B65H 29/00 (2006.01)
G03G 15/00 (2006.01)

(52) U.S. Cl. ........ 271/186; 271/184; 271/303; 271/304; 399/367; 399/374; 399/364

(58) Field of Classification Search ............ 271/186, 271/3.14, 3.19, 219, 184, 303, 304; 399/367, 399/374, 364
See application file for complete search history.

(56) References Cited

U.S. PATENT DOCUMENTS

| | | | |
|---|---|---|---|
| 5,784,680 A * | 7/1998 | Taruki | 399/374 |
| 6,354,589 B1 * | 3/2002 | Taruki et al. | 271/265.01 |
| 6,746,013 B2 * | 6/2004 | Shih | 271/186 |
| 7,481,427 B2 * | 1/2009 | Tokutsu | 271/186 |
| 7,607,658 B2 * | 10/2009 | Fujiwara | 271/186 |
| 7,717,423 B2 * | 5/2010 | Litman et al. | 271/273 |
| 7,764,920 B2 * | 7/2010 | Lin et al. | 399/374 |
| 2007/0020007 A1 * | 1/2007 | Azuma | 399/367 |

FOREIGN PATENT DOCUMENTS

| | | |
|---|---|---|
| JP | 2000-089524 | 3/2000 |
| JP | 3449805 | 7/2003 |
| JP | 3449870 | 7/2003 |
| JP | 3546822 | 4/2004 |

OTHER PUBLICATIONS

English language abstract of Japanese Publication No. JP 9-166896, published Jun. 24, 1997.
English language abstract of Japanese Publication No. JP 2002-077519, published Mar. 15, 2002.
English language abstract of Japanese Publication No. JP 8-133551, published May 28, 1996.
English language abstract of Japanese Publication No. JP 2000-089524, published Mar. 31, 2000.

* cited by examiner

*Primary Examiner* — Stefanos Karmis
*Assistant Examiner* — Luis Gonzalez
(74) *Attorney, Agent, or Firm* — Harness, Dickey & Pierce

(57) ABSTRACT

In an automatic original conveying device, a motor rotates in a single direction and a driving force transmission mechanism transmits the driving force of the motor from a sheet feeding roller to a switchback roller. The sheet feeding roller conveys an original that stands by in a switchback conveying path to a second conveying path. A sorting unit sorts the original conveyed from a paper delivery path to an original delivery table or to the switchback conveying path. The switchback roller is provided between the sorting unit and the switchback conveying path and it is rotatable in a normal direction or a reverse direction.

9 Claims, 11 Drawing Sheets

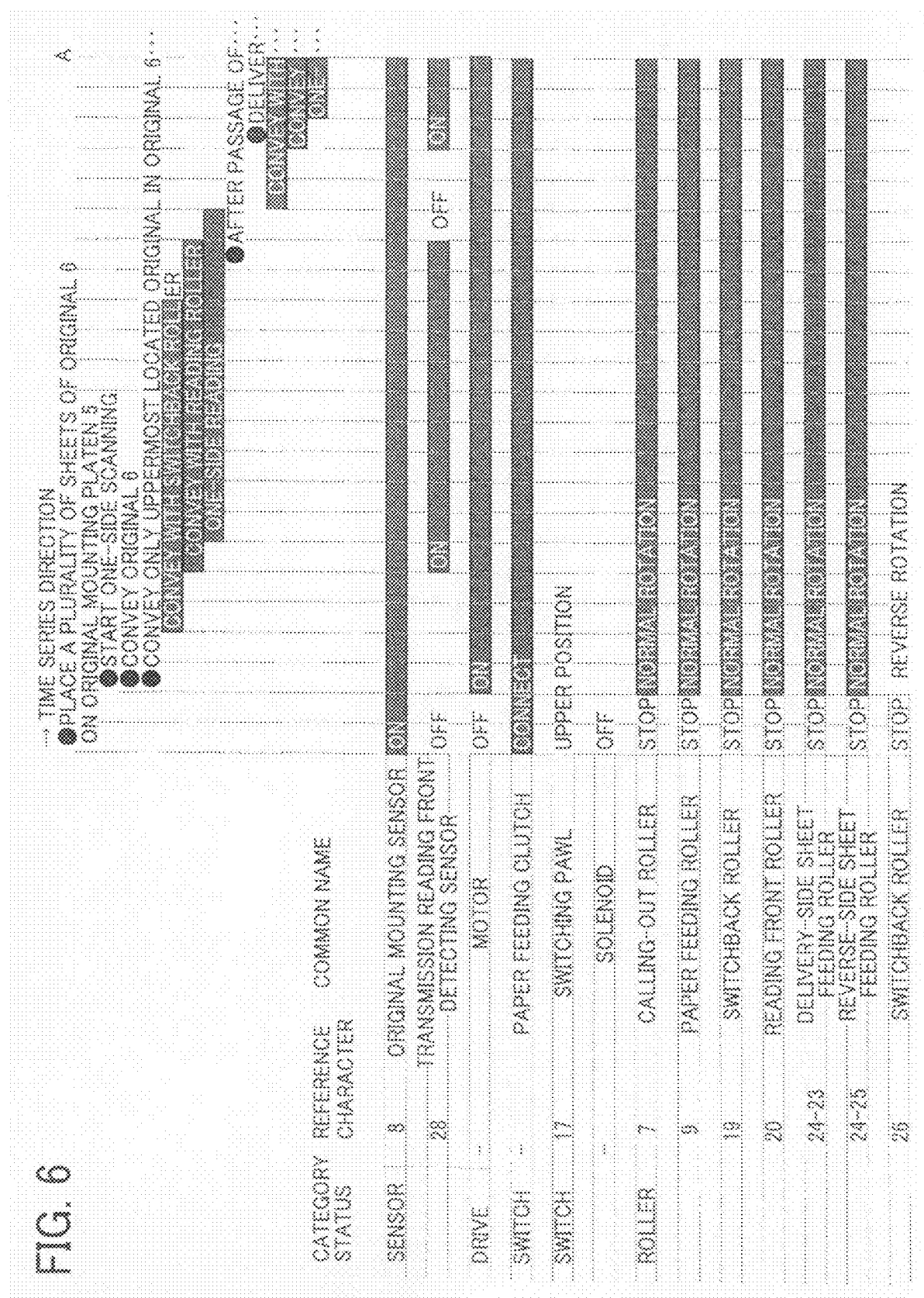

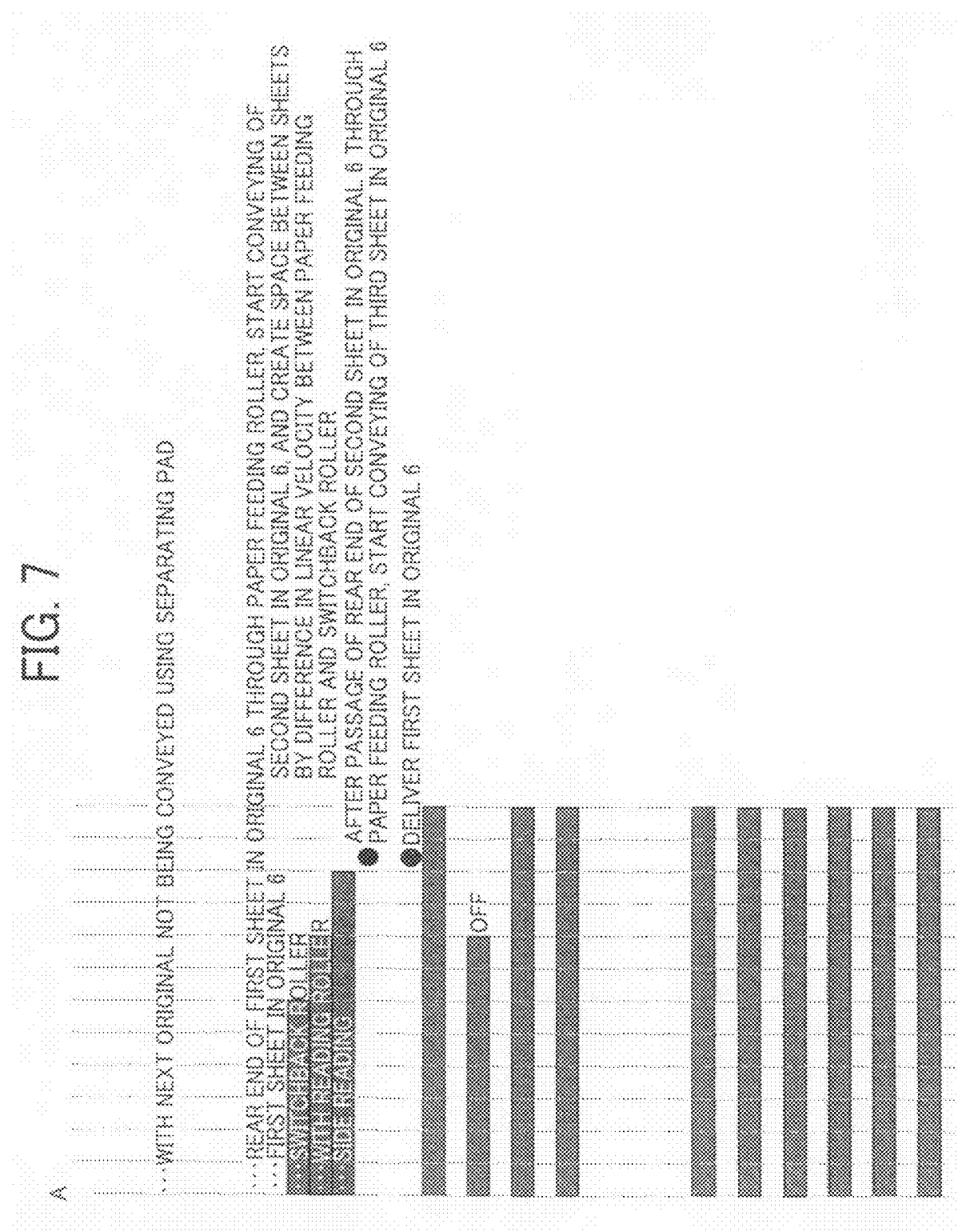

FIG. 10

AUTOMATIC ORIGINAL CONVEYING DEVICE AND IMAGE FORMING APPARATUS

CROSS-REFERENCE TO RELATED APPLICATIONS

The present application claims priority to and incorporates by reference the entire contents of Japanese priority document 2008-118716 filed in Japan on Apr. 30, 2008.

BACKGROUND OF THE INVENTION

1. Field of the Invention

The present invention relates to an automatic original conveying device and an image forming apparatus.

2. Description of the Related Art

An automatic original conveying device is provided in image forming apparatuses. In the image forming apparatuses, originals, which have been set on an original mounting platen in such a state that the image surface of each original faces upward, are successively separated one by one from the uppermost original, are reversed, are conveyed to a predetermined reading position, and as such are delivered without stopping. Copying machines, facsimile machines, and scanners are the examples of the image forming apparatuses.

Japanese Patent Application Laid-open No. H9-166896 discloses an automatic original conveying device. This automatic original conveying device includes an original mounting platen for mounting originals, a separating/conveying unit that separates and conveys the originals mounted on the original mounting platen successively one by one from the uppermost original, a first conveying path that receives the original from the separating/conveying unit, reverses the original and conveys the reversed original to a reading position provided below the original mounting platen, a paper delivery path that conveys the original from the reading position to an original delivery port, an original delivery table that is provided at a position below the original mounting platen and on an extension of the paper delivery path, a switchback conveying path provided between the original mounting platen and the original delivery table, a switching member that can perform switching between a switching position at which the paper delivery path is communicated with the original delivery port and a switching position at which the switchback path is communicated with the paper delivery path, and a pair of paper delivery rollers that is provided on an upstream side of the switching member in a conveying direction of the original so as to be rotatable in normal and reverse directions. When the original has been led to the switchback conveying path, the paper delivery rollers are rotated in a reverse direction in such a state that the rear end of the original is held between the paper delivery rollers to switchback the original from the switchback conveying path to the second conveying path. In this structure, the original can be switched-back and can be reversed and again returned to the reading position, and, thus, a small-sized automatic original conveying device, which has a shorter original conveying path, for reading both sides of the original can be provided.

Japanese Patent Application Laid-open No. H8-133551 discloses a sheet conveying device for an image reading device. This sheet conveying device includes a sheet pressing unit that presses a sheet mounted on a platen against the surface of the platen, a sheet mounting unit that is provided above the sheet pressing unit and receives sheets in a stacked state, a conveying unit provided with a conveying path that receives the sheet from the sheet mounting unit through an inlet side, allows the sheet to be passed through the reading position, at which the image on the sheet is read, and delivers the sheet through a paper delivery port, and a switchback path that is provided between the sheet pressing unit and the sheet mounting unit and leads the sheet, passed through the reading position, by switchback conveying to the inlet side of the conveying path. The sheet conveying device includes a pair of switchback rollers provided in the switchback path and including a pair of rollers that perform switchback conveying of the sheet passed through the reading position, and a roller spacing unit that spaces rollers constituting the switchback rollers from each other. The switchback rollers serve also as the sheet delivery unit. A registration unit that adjusts timing of sheet alignment and sheet feeding is provided on the downstream side of a point at which the conveying path meets the switchback path. The registration unit includes a pair of rollers that comes into rolling contact with each other. The conveying unit includes a plurality of large-diameter wheel-shaped axially-arranged members. The point of rolling contact in the rollers is provided on a circumference of the wheel-shaped members. The backside of the sheet pressing unit may be configured as a part of the switchback path.

Japanese Patent Application Laid-open No. 2002-77519 discloses a double-sided original reading device. In this original reading device, a conveying unit in a conveying system is rotated in a sheet original conveyance direction by normal rotation of a single driving source. A conveying unit in a delivery system is rotated in a direction in which the sheet original undergoes switchback reversing. A conveying unit in a scanning system including a registration roller is rotated, by reverse rotation of the single driving force, in a direction, in which the sheet original is conveyed to a reading unit and is read, and the conveying unit in the delivery system is rotated in a direction in which the sheet original is delivered. The double-sided original reading device is characterized in that, upon detection of the passage of the sheet original with the resist sensor, the single driving source is switched from normal rotation to reverse rotation.

Japanese Patent Application Laid-open No. 2000-89524 discloses an original conveying device. In this original conveying device, when a motor is rotated in a normal direction, the paper delivery roller is rotated in the normal direction to convey the original in a paper delivery direction. On the other hand, when the motor is rotated in a reverse direction, the paper delivery roller is rotated in the reverse direction to convey the original to a reverse conveying path. Moreover, when the motor is rotated in a normal direction, a PS roller is rotated in a normal direction to send the original to an original reading position, and, when the motor is rotated in a reverse direction, a clutch is released to stop the rotation.

In many original conveying devices requiring switchback reversing described in Japanese Patent Application Laid-open No. H9-166896, two motors, that is, a motor that drives a switchback roller, and a motor that drives another conveying roller, are used to drive the conveying roller in a given direction independently of normal and reverse rotations of the switchback roller. This arrangement however makes the structure complicated.

In the sheet conveying device disclosed in Japanese Patent Application Laid-open No. H8-133551, when a roller spacing unit, which spaces rollers constituting the switchback rollers from each other, is used, an operating unit such as a solenoid is necessary in the roller spacing unit. Also, when the switchback conveying path is used, an operating unit such as a solenoid is necessary as a switching unit for a switching member which is switchable to a switching position at which the switchback path is communicated with the paper delivery path. In this structure, control such as synchronization control becomes complicated leading to problems such as increased cost.

In the original reading device disclosed in Japanese Patent Application Laid-open No. 2002-77519, for example, the driving source is rotated in normal and reverse directions, and a switching member, which can perform switching to a switching position at which a paper delivery path is communicated with an original delivery port and switching to a switching position at which a switch back path is communicated with the paper delivery path, is operated by a driving source provided separately from a driving source that performs switching between normal rotation and reverse rotation of the switchback roller. This arrangement however makes the control complicated.

In the original conveying device disclosed in Japanese Patent Application Laid-open No. 2000-89524, as with the sheet conveying device disclosed in Japanese Patent Application Laid-open No. H8-133551, the original conveying device suffers from problems such as increased cost as a result of complicated control such as synchronization control.

SUMMARY OF THE INVENTION

It is an object of the present invention to at least partially solve the problems in the conventional technology.

According to an aspect of the present invention, there is provided an automatic original conveying device including an original mounting platen for placing an original; an original delivery table that is provided downstream of the original mounting platen in an original conveying direction for delivering an original after completion of reading of an original; a first conveying path that guides an original placed on the original mounting platen to a reading position provided upstream of the original delivery table in the original conveying direction; a paper delivery path that guides the original in a region between the reading position and the original delivery table; a switchback conveying path receives the original from the paper delivery path and allows the original to stand by; a second conveying path that receives the original from the switchback conveying path and guides the original to the first conveying path; a sheet feeding roller that conveys the original guided by the paper delivery path, and conveys the original that stands by in the switchback conveying path, to the second conveying path; a sorting unit that sorts the original conveyed from the paper delivery path by the sheet feeding roller as an original to be delivered to the original delivery table or as an original that is allowed to stand by in the switchback conveying path; and a switchback roller that is provided between the sorting unit and the switchback conveying path and that is rotatable in a normal direction or a reverse direction; a rotation driving source that is rotated in a single direction; and a driving force transmission mechanism that transmits a rotation driving force generated by the rotation driving source from the sheet feeding roller to the switchback roller.

According to another aspect of the present invention, there is provided an image forming apparatus including the above automatic original conveying device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 6 and 7 depict a timing chart for explaining reading of one side of an original in the automatic original conveying device according to the second embodiment;

FIGS. 8, 9, and 10 depict a timing chart for explaining reading of both sides of an original in the automatic original conveying device according to the second embodiment.

DETAILED DESCRIPTION OF THE PREFERRED EMBODIMENTS

Exemplary embodiments of an automatic original conveying device and an image forming apparatus according to the present invention will be explained below in more detail with reference to the accompanying drawings.

Figure 1:
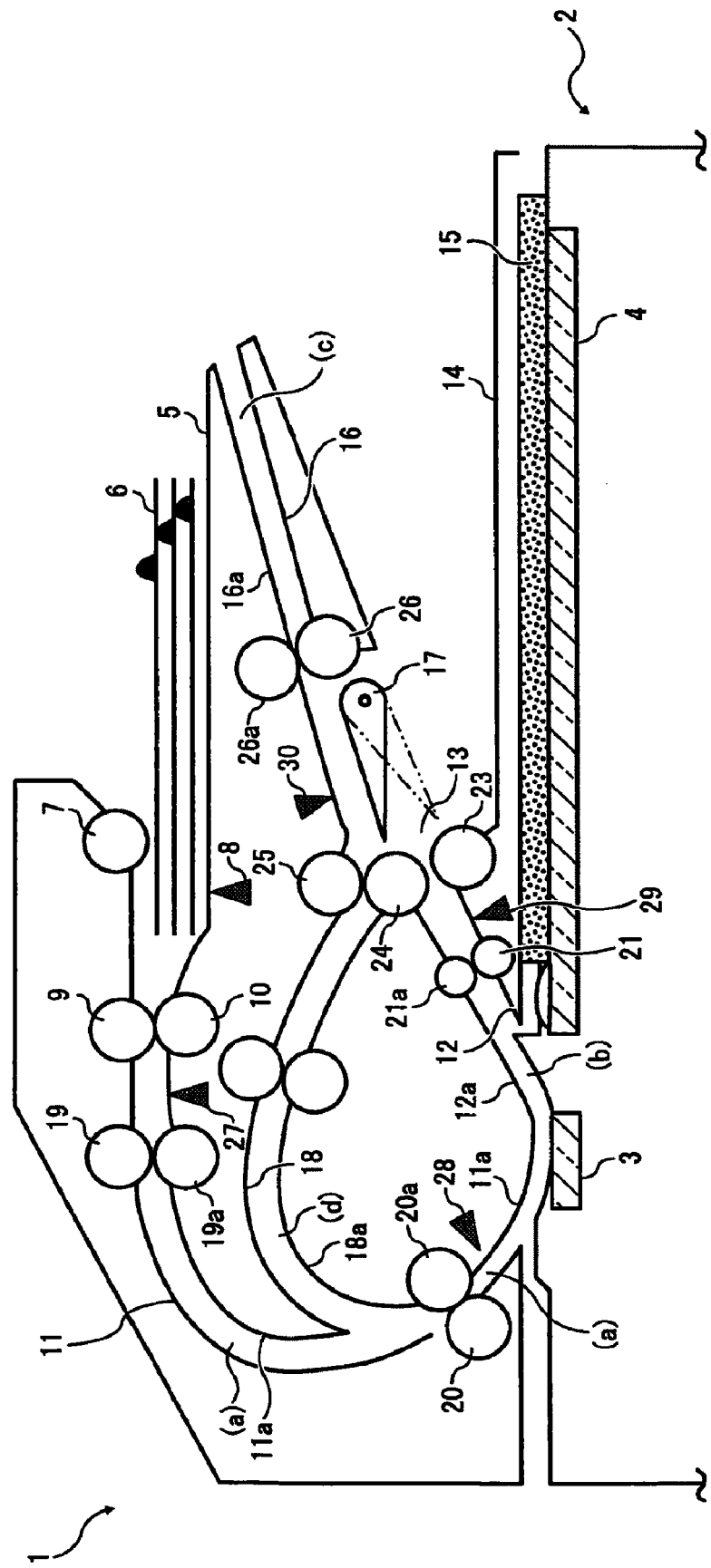
FIG. 1 is a schematic cross-sectional view of an automatic original conveying device according to a first embodiment of the present invention.

FIG. 1 is a schematic side view of an automatic original conveying device 1 according to a first embodiment of the present invention. The automatic original conveying device 1 is openably mounted on the upper part of an image reading device 2 in an image forming apparatus such as a copying machine, a facsimile machine, or a scanner. The image forming apparatus has been omitted from FIG. 1. A slit glass (reading position) 3 and a contact glass 4 are provided on the upper surface of the image reading device 2. An original is conveyed by the automatic original conveying device 1 and is passed over the slit glass 3 or is set on the contact glass 4 so that an image on the original can be read. Either a one-side mode or a two-side mode can be set depending on an instruction from an operating unit (not shown) in the image reading device 2. The operations of the automatic original conveying device 1 are controlled as per the set mode.

The automatic original conveying device 1 includes an original mounting platen 5 on which an original 6 is mounted and set. Sheets of the original 6 are set in the order of pages in such a state that a side of the original on which an image has been printed faces upward. A calling roller 7 picks-up one original from the original mounting platen 5 and sends the picked original 6 to a separating unit located on the downstream of the calling roller 7 in the original conveying direction. The calling roller 7 is usually located at a stand-by position spaced by a predetermined distance from the original mounting platen 5. When an original mounting sensor 8 detects presence of an original on the original mounting platen 5 and, further, upon receiving an instruction for starting feeding of the original, the calling roller 7 is made to descend from the stand-by position and move to a position at which the calling roller 7 comes into contact with the upper surface of the original 6.

A paper feeding roller 9 is rotated clockwise to feed the original 6 on the original mounting platen 5. A blocking roller 10 is stopped or rotated clockwise to separate, at a position between the blocking roller 10 and the paper feeding roller 9, sheets of the original 6, called by the calling roller 7, successively one by one from the uppermost sheet by mutual friction. In FIG. 1, a configuration using the blocking roller 10 for paper separating has been explained. However, the same effect can be achieved by using a separating pad having a face, which causes a frictional action with the original, instead of the blocking roller 10.

A first conveying path (a) is defined by guides 11, 11a and it is a path through which the original 6, separated and conveyed by the paper feeding roller 9 in the separating unit, moves until the original 6 reaches the slit glass 3. The first conveying path (a) is provided in an arch form between the separating unit and the slit glass 3 where the original 6 is read (scanned). The first conveying path (a) reverses the original 6 sent by the paper feeding roller 9 and leads the reversed original 6 onto the slit glass 3.

A paper delivery path (b) is defined by guides 12, 12a and it is a path through which the original 6, passed over the slit glass 3 from the first conveying path (a), moves until the original 6 reaches an original delivery port 13. The original 6 is delivered from the original delivery port 13 and loaded on an original delivery table 14. The original delivery table 14 is provided at a position below the original mounting platen 5 and on the upper part of the contact glass 4. A pressing unit 15 formed of an elastic member, such as sponge or rubber, is provided on a face located below the original delivery table 14 and opposite to the contact glass 4. The pressing unit 15 presses the original set at a predetermined reading position on the contact glass 4 to prevent the original from being lifted from the contact glass 4.

A switchback conveying path (c) is defined by guides 16, 16a and by the guide 16a and a switching pawl 17 located at a position on the lower part of the original mounting platen 5 and above the original delivery table 14. The switchback conveying path (c) is provided at a position on the lower part of the original mounting platen 5 and above the original delivery table 14. The original 6 that is delivered from the original delivery port 13 is conveyed in the switchback conveying path (c), the original 6 is switched-back and is again led to the first conveying path (a).

The switching pawl 17 is provided in between the paper delivery path (b) and the switchback conveying path (c). When the switching pawl 17 is in a position indicated by a dotted line, the original 6 delivered from the original delivery port 13 is led to the switchback conveying path (c) without being loaded on the original delivery table 14. Upon entry of the original 6 into the switchback conveying path (c), the switching pawl 17 is switched to a position indicated by a solid line, and the original 6 switched-back through the switchback conveying path (c) is led from the rear end to a second conveying path (d). The switching pawl 17 constitutes a sorting unit.

The second conveying path (d) is defined by guides 18, 18a and it connects the switchback conveying path (c) to the first conveying path (a). The second conveying path (d) is a path through which the original 6, which is switched-back through the switchback conveying path (c), moved to the first conveying path (a). A pair of rollers 19, 19a and a pair of rollers 20, 20a convey the original 6 delivered from the paper feeding roller 9 in the first conveying path (a) to the slit glass 3. A pair of rollers 21, 21a conveys the original 6 passed over the slit glass 3 in the paper delivery path (b) to the original delivery port 13. A pair of rollers 22, 22a conveys the original 6 in the second conveying path (d) to the first conveying path (a).

Sheet feeding rollers 23, 24, 25 are provided near the original delivery port 13. The original 6 being passed through the paper delivery path (b) is conveyed through between the rollers 23, 24 to the original delivery table 14 or the switchback conveying path (c). The original 6 switched-back through the switchback conveying path (c) is conveyed through between the rollers 24, 25 from the switchback conveying path (c) to the second conveying path (d).

A pair of rollers 26, 26a is provided on the switchback conveying path (c) as feeding rollers (switchback rollers). The rollers 26, 26a can rotate in a normal direction and a reverse direction. The rollers 26, 26a, when they rotate in the normal direction, insert the original 6 that is moving through the switchback conveying path (c) into the switchback conveying path (c). Thereafter, the rollers 26, 26a are rotated in the reverse direction to switchback the original 6 from the paper delivery path (b) to the second conveying path (d).

A sensor 27 is provided near an inlet of the first conveying path (a) between a combination of the paper feeding roller 9 with the blocking roller 10 and the rollers 19, 19a in the separating unit, that is, near the downstream side of the paper feeding roller 9 in the original conveying direction. A sensor 28 is provided near an outlet of the first conveying path (a) between the rollers 20, 20a and the slit glass 3, that is, near the upstream side of the slit glass 3 in the original conveying direction. A sensor 29 is provided in the paper delivery path (b) between the rollers 21, 21a and the rollers 23, 24. A sensor 30 is provided between the rollers 23, 24, 25 and the rollers 26, 26a. The sensors 27, 28, 29, 30 are transmission-type sensors and they detect the front end, or the rear end, of the original 6 passed therethrough.

Figure 2:
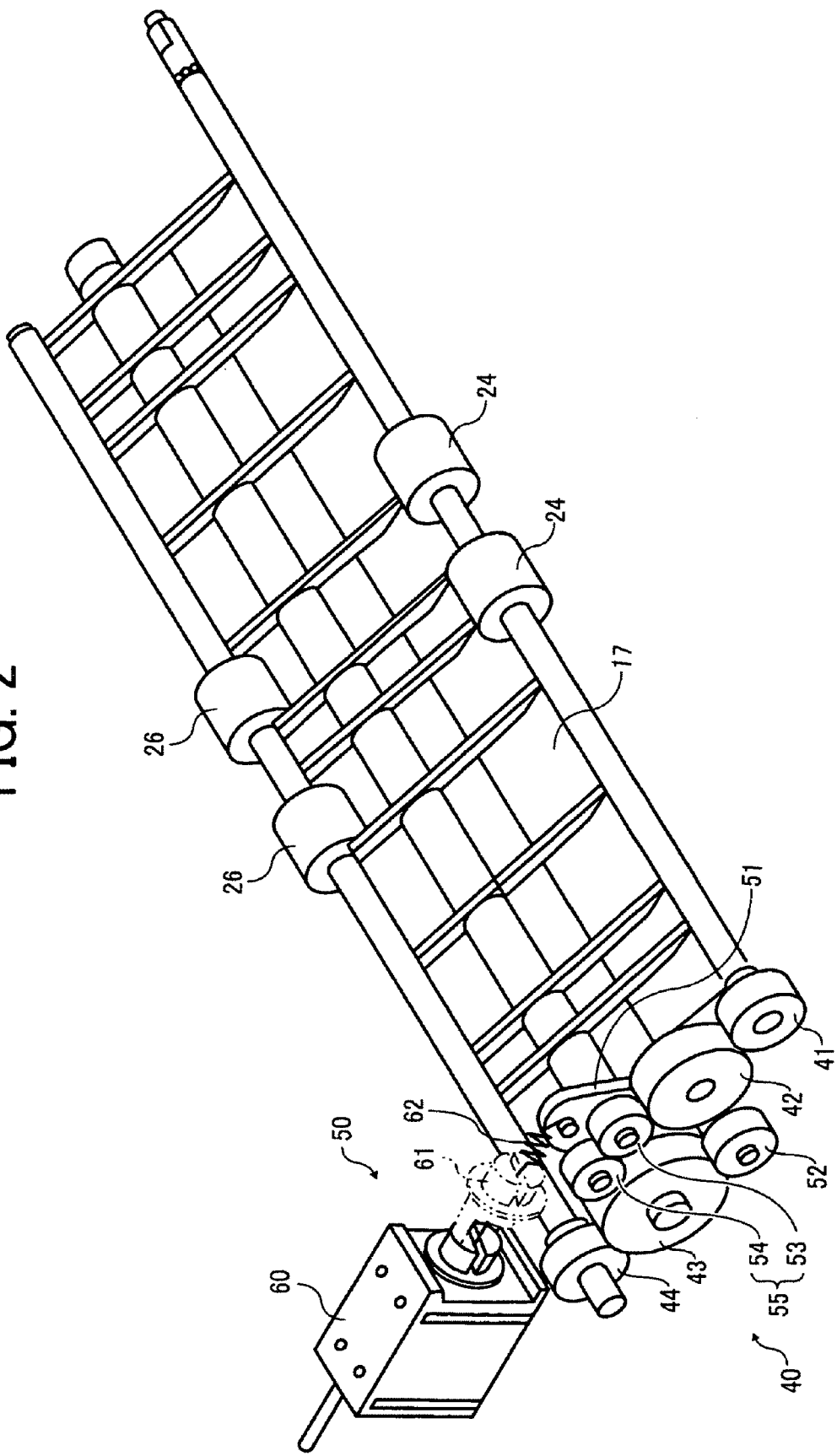
FIG. 2 is a perspective view of a driving force transmission mechanism in the automatic original conveying device shown in FIG. 1.
Figure 3:
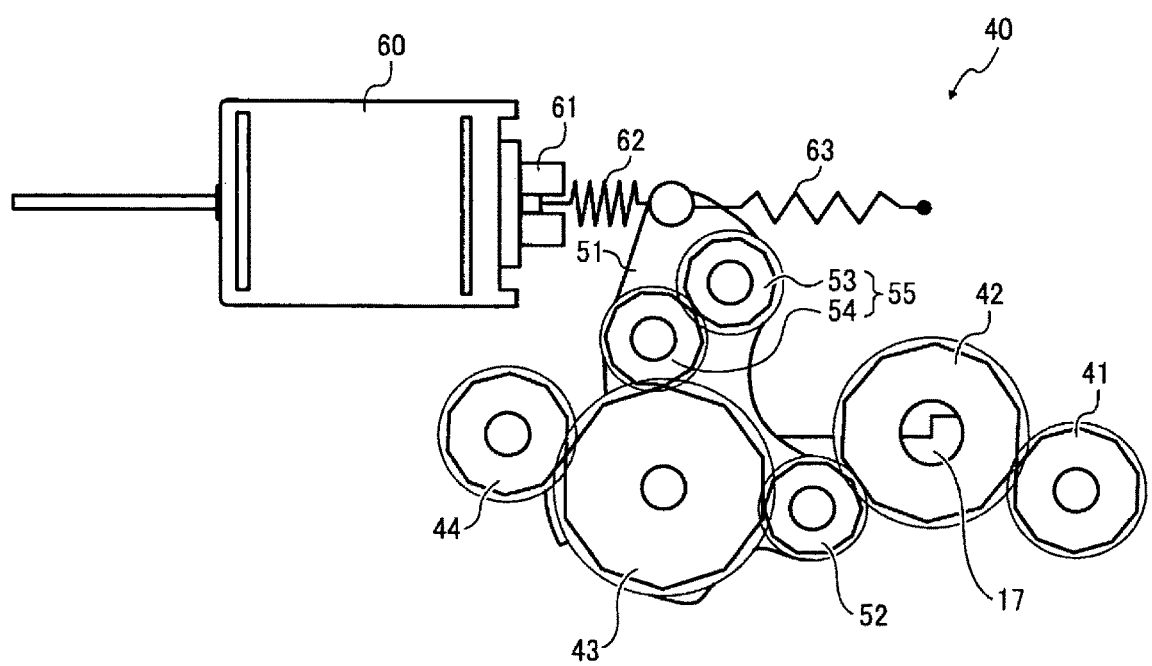
FIG. 3 is a schematic side view of the driving force transmission mechanism shown in FIG. 2.
Figure 4A:
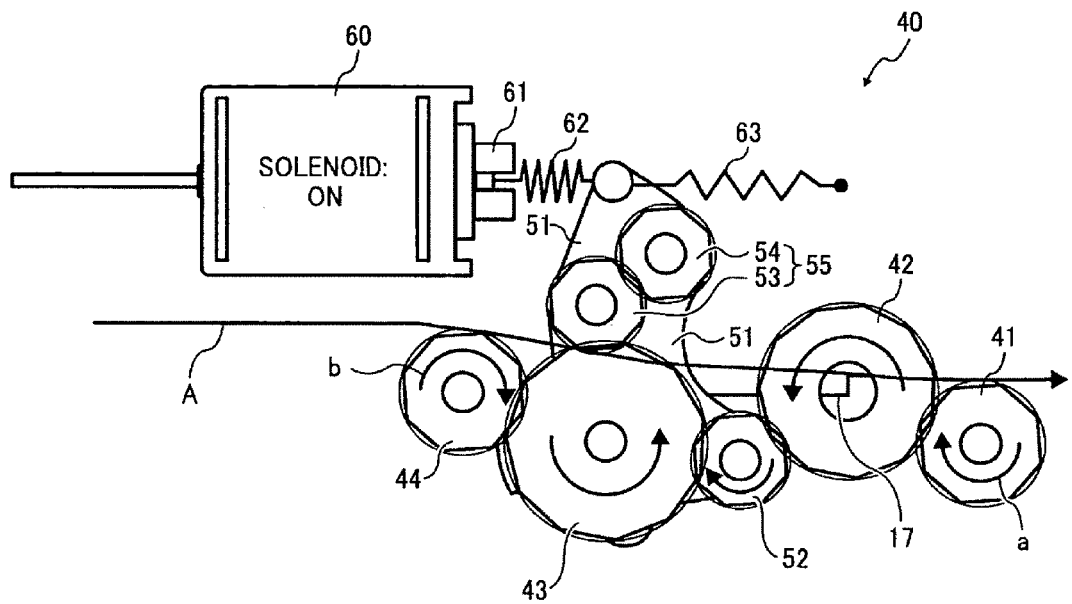
FIG. 4A is a schematic side view of the driving force transmission mechanism shown in FIG. 2 in an on state of a solenoid and FIG. 4B is a schematic side view of the driving force transmission mechanism shown in FIG. 2 in an off state of the solenoid.
Figure 4B:
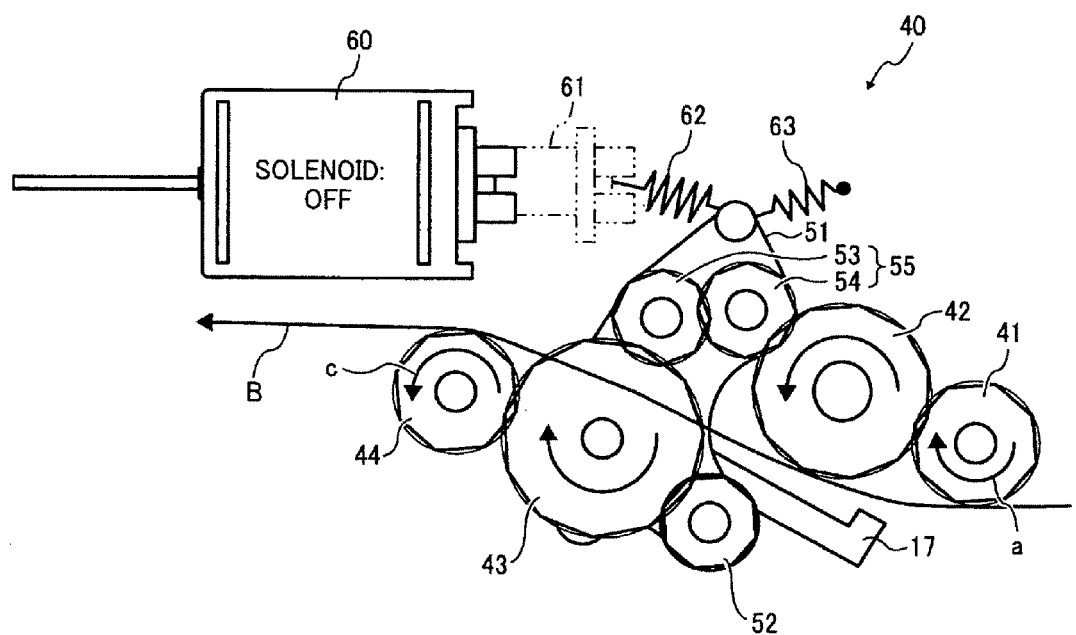

Next, a driving force transmission mechanism 40 in the automatic original conveying device 1 will be explained. FIG. 2 is a perspective view of the driving force transmission mechanism 40. FIG. 3 is a schematic side view of the driving force transmission mechanism 40. FIG. 4A is a schematic side view of the driving force transmission mechanism 40 in an on state of a solenoid 60 and FIG. 4B is a schematic side view of the driving force transmission mechanism 40 in an off state of the solenoid 60.

The automatic original conveying device 1 includes the sheet feeding rollers 24, the switching pawl 17, the switchback rollers 26, the driving force transmission mechanism 40 that rotates the switchback rollers 26, and a rotation switching mechanism 50. The rotation switching mechanism 50 is a part of the driving force transmission mechanism 40 and it switches the direction of rotation of the driving force transmission mechanism 40. The driving force transmission mechanism 40 includes, as a gear train, a gear 41 provided coaxially with the sheet feeding roller 24, a gear 42 engaged with the gear 41, a gear 43 spaced from the gear 42, and a gear 44 that is engaged with the gear 43 and is provided coaxially with the switchback roller 26. The gear 41 is rotated in one direction with a motor as a rotation driving source (not shown). The gear 42 and the gear 43 are spaced from each other and they constitute a spaced gear train. A normal rotation gear 52, or a pair of reverse rotation gears 55 that includes gears 53, 54, in the rotation switching mechanism 50 is provided between the gear 42 and the gear 43 constituting the spaced gear train to rotate the gear 43 in a normal direction or a reverse direction.

The rotation switching mechanism 50 includes the solenoid 60, a rotary plate 51 rotated by the solenoid 60, the normal rotation gear 52 disposed on the rotary plate 51 and including one gear selectively disposed between the gears constituting the spaced gear train, and the reverse rotation gears 55, disposed so that the spaced gear train is located between the normal rotation gear 52 and the reverse rotation gears 55. When the solenoid 60 is in an on state, a shaft 61 is drawn in. On the other hand, when the solenoid 60 is in an off state, the shaft 61 is brought to a released state and is withdrawn by a coil spring 63 (see FIG. 3). The rotary plate 51 is integrally connected to the switching pawl 17. Upon receiving a driving force of the solenoid 60, the switching pawl 17 sorts the original 6, which is conveyed through the paper delivery path by the sheet feeding rollers 24, as a sheet to be delivered to the original delivery table 14 or as a sheet that stands by in the switchback conveying path. The shaft 61 of the solenoid 60 and the rotary plate 51 are connected to each other through a coil spring 62 as an elastic body. Accordingly, the force developed by the engagement of gears with each other because of swinging of the rotary plate 51 upon turning-on of the solenoid 60 can be reduced by the coil spring 62. Consequently, the breaking of components of the rotation switching mechanism 50 such as the rotary plate 51 and the load applied to the shaft can be reduced.

In the driving force transmission mechanism 40, the gear 41 is rotated in one direction (an arrow a in FIG. 4A) with a motor (not shown) as a driving source to rotate the sheet feeding rollers 24. Further, the gear 44 rotates the switchback roller 26 by utilizing a driving force from the gear 41 transmitted through the rotation switching mechanism 50 by the driving force transmission mechanism 40. In this case, the gear 44 is selectively rotated in a normal direction (an arrow b in FIG. 4A) or a reverse direction (an arrow c in FIG. 4B) depending upon the status of the rotation switching mechanism 50, that is, whether the gear disposed in the spaced gear train is the normal rotation gear 52 or the reverse rotation gears 55.

That is, the rotation switching mechanism 50 rotates the rotary plate 51 by switching the solenoid 60 to an on state (FIG. 4A) or to an off state (FIG. 4B) to perform control so that the normal rotation gear 52, or the reverse rotation gears 55, comes into contact with or is separated from the gear 42 and the gear 43 constituting the spaced gear train, whereby the direction of rotation of the switchback roller 26a is switched to a normal direction or a reverse direction depending upon whether the number of connected gears is an odd number, that is, the connected gear is the normal rotation gear 52, or the number of connected gears is an even number, that is, the connected gear is the reverse rotation gears 55.

When the solenoid 60 is in the off state, the reverse rotation gears 55 and the spaced gear train are in such a positional relationship that the reverse rotation gears 55 bites into the gear 42 and the gear 43 constituting the spaced gear train, the gears constituting reverse rotation gears 55 are not separated from each other and reliably engage with each other even upon turning-off of the solenoid, whereby tooth skipping can be prevented. Conversely, when the positional relationship is such that the reverse rotation gears 55 escapes from the spaced gear train, a configuration that the reverse rotation gears 55 engages with the spaced gear train upon turning-on of the solenoid 60 can prevent tooth skipping.

In this manner, the rotation switching mechanism 50 can switch the direction of rotation of the switchback rollers 26 independently, i.e., without switching the direction of rotation of the rollers located on the upstream of the sheet feeding rollers 24 in the motor power transmission direction. This fact means that double-sided originals can be conveyed by the rotation of the motor in one direction. Therefore, unlike the conventional one-motor machine, the complication of control due to switching of the direction of rotation can be prevented. Further, by virtue of the rotation only in one direction, the provision of a one-way mechanism within the same roller transmission path is not required. Accordingly, rattling does not occur in conveying by the same rollers, and, thus, conveying the original is not significantly influenced by a speed fluctuation which occurs, for example, in the removal of the original from the roller.

Further, the switching pawl 17, which functions as the sorting unit, is interlocked with the mechanism that switches the direction of rotation of the switchback roller 26. With this configuration, switching of the original conveying path and switching of the rotation direction of the switchback rollers 26 can be performed by only one solenoid 60. Thus, cost reduction, space saving, simplification of control can be realized.

The operation of the automatic original conveying device 1 will be explained. At the outset, one-side reading will be explained. In such a state that one-side mode is set, upon the depression of a start key provided on an operation unit (not shown) in the image reading device 2, whether the original is set on the original mounting platen 5 is determined based on a detection signal from the original mounting sensor 8. When the original is set on the original mounting platen 5, the action of original feeding is started. In the rotation switching mechanism 50, the calling roller 7 and the paper feeding roller 9 are first driven, and the driving force transmission mechanism 40 is driven. Consequently, the calling roller 7 is brought to a descended state (FIG. 3A), and the original 6 is sent to a separating unit. In the separating unit, sheets in the original 6 set on the original mounting platen 5 are separated successively one by one from the uppermost located sheet and are sent to the first conveying path (a).

Subsequently, upon detection of the front end of the original 6 with the sensor 28, the timing of reading of the original 6 is adjusted, and the original 6 is read. When a predetermined time T2 has elapsed after detection of the passage of the rear end of the original 6 with the sensor 29, the original 6 is delivered from the original delivery port 13 and it is loaded on the original delivery table 14 in such a state that the image surface faces downward.

When the original mounting sensor 8 has already detected the original 6 upon detection of the passage of the rear end of the original 6 with the sensor 28, the operation of feeding of a second sheet of the original 6 is started. Thereafter, the operation of feeding of an original 6 is repeated until the presence of the original 6 is not detected by the original mounting sensor 8. Thus, one-side original processing for all the originals 6 placed on the original mounting platen 5 is completed.

Next, reading of both sides of the original will be explained. Until, upon the depression of the start key provided in the operating unit (not shown) in the image reading device 2, the front end of a first sheet of the original is detected with the sensor 28, the same operation as in the one-side mode setting is performed. Upon detection of the front end of the original 6 with the sensor 28, the rollers 21, 21a and the rollers 23, 24, 25 are driven based on the detection signal, and the rollers 26, 26a are rotated in the normal direction. Further, the timing of reading of the original 6 is adjusted based on the detection signal, and an image on the surface of the original 6 is read.

Upon detection of the passage of the rear end of the original 6 with the sensor 28, driving of the rollers 19, 19a is stopped. Thereafter, upon detection of the passage of the rear end of the original 6 with the sensor 29, the solenoid 60 is brought to an on state (FIG. 4A), and the motor is rotated. Consequently, the switching pawl 17 is switched from the position indicated by the solid line to the position indicated by the dotted line in FIG. 1, and the rollers 26, 26a are rotated in the normal direction. Further, upon detection of the passage of the rear end of the original 6 with the sensor 30, the solenoid 60 is brought to an off state (FIG. 4B). Consequently, the switching pawl 17 is switched from the position indicated by the dotted line to the position indicated by the solid line, and the direction of the rotation of the rollers 26, 26a is switched to the reverse direction. In a configuration that the sensor 29 is absent, after the elapse of a predetermined time Ta upon detection of the passage of the rear end of the original 6 over the sensor 28, the solenoid 60 is brought to an on state (FIG. 4A). Consequently, the switching pawl 17 is switched from the position indicated by the dotted line to the position indicated by the solid line, and the direction of the rotation of the rollers 26, 26a is switched to the normal direction. Because of reversal of rotation of the rollers 26, 26a by the switching, the original 6 is switched-back and it is inserted into the second conveying path (d) from the rear end of the original 6.

Next, the original 6 in the second conveying path (d) is then sent to the first conveying path (a). Upon detection of the front end of the original 6 with the sensor 28, in the same manner as the front side, reading and switchback conveying of the back side are performed, and the original 6 is again sent to the first conveying path (a). When the original 6 is again sent to the first conveying path (a) and the front end of the original 6 is again detected with the sensor 28, the reading of the original 6 is not performed.

Thereafter, when the front end of the original 6 is detected with the sensor 29, the switching pawl 17 is not actuated. In this case, after the elapse of a predetermined time T2 upon detection of the passage of the rear end of the original 6 with the sensor 29, the original 6 is delivered from the original delivery port 13 and is delivered on the original delivery table 14 in such a state that the front side faces downward.

When the original mounting sensor 8 has already detected the original 6 upon third detection of the passage of the rear end of the original 6 with the sensor 28, the operation of feeding of a second sheet of the original 6 is started. Thereafter, until the presence of the original 6 is not detected by the original mounting sensor 8, the operation of feeding of an original is repeated. Thus, the double-sided original processing for the original 6 placed on the original mounting platen 5 is completed.

Figure 5A:
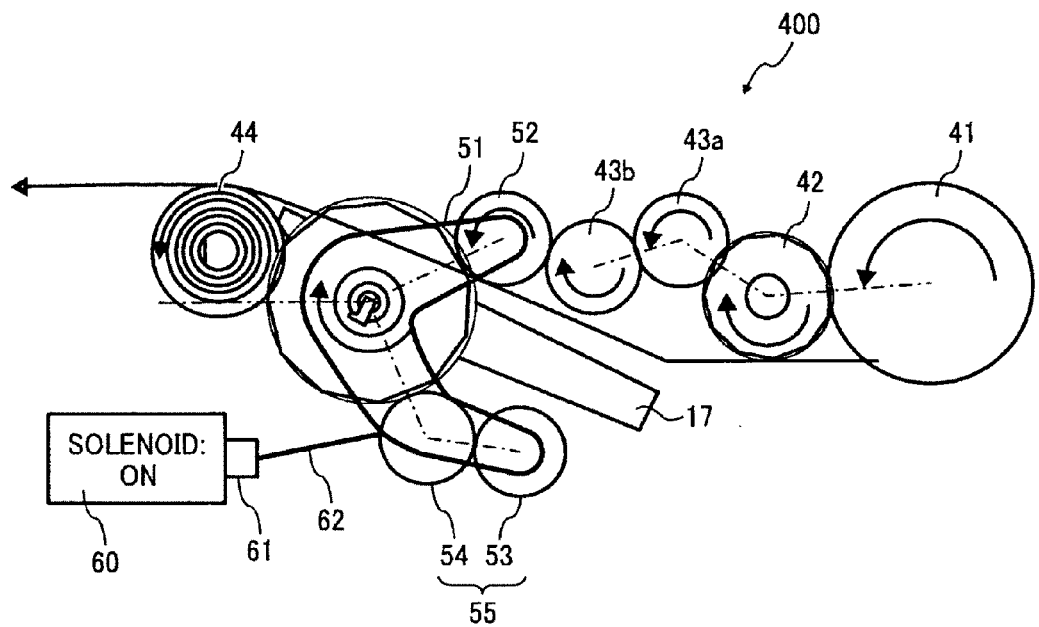
FIGS. 5A and 5B are schematic side views of a driving force transmission mechanism in an automatic original conveying device according to a second embodiment of the present embodiment.
Figure 5B:
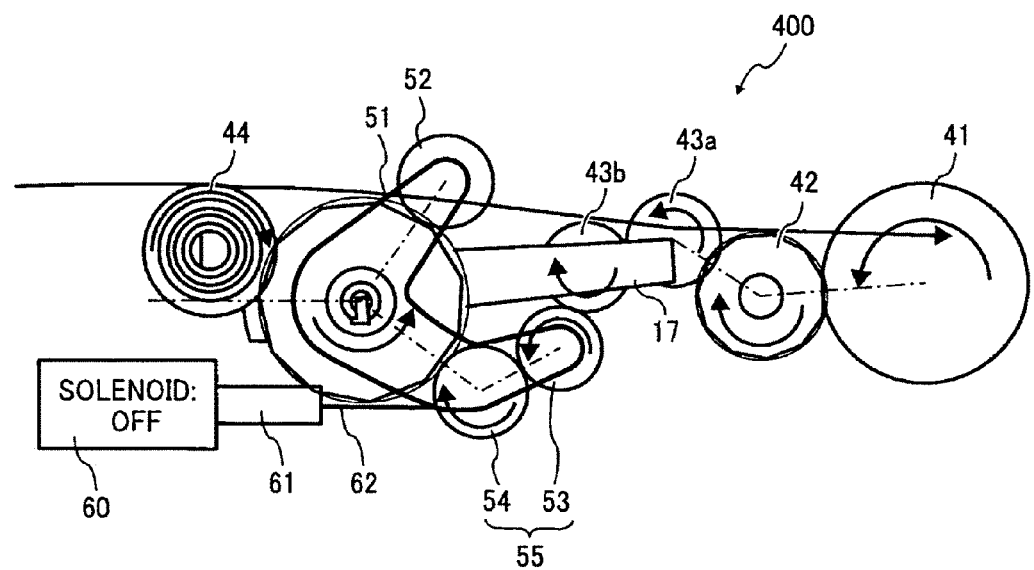

Next, a second embodiment of the present invention will be explained. FIGS. 5A and 5B are schematic side views of a driving force transmission mechanism 400 in an automatic original conveying device according to the second embodiment. The driving force transmission mechanism 400 includes the gear 41, the gear 42, a gear 43a, a gear 43b, and the gear 44. Thus, the driving force transmission mechanism 400 includes one excess gear than the driving force transmission mechanism 40. The positional relationship between the normal rotation gear 52 and the reverse rotation gears 55 is reversed, and the position of the solenoid 60 is changed to a position below the gear 44. When the solenoid 60 is in an on state, as shown in FIG. 5A, the switching pawl 17 is moved downward and the gear 44 is rotated in a normal direction. On the other hand, when the solenoid 60 is in an off state, as shown in FIG. 5B, the switching pawl 17 is moved upward and the gear 44 is rotated in a reverse direction.

Figure 8:
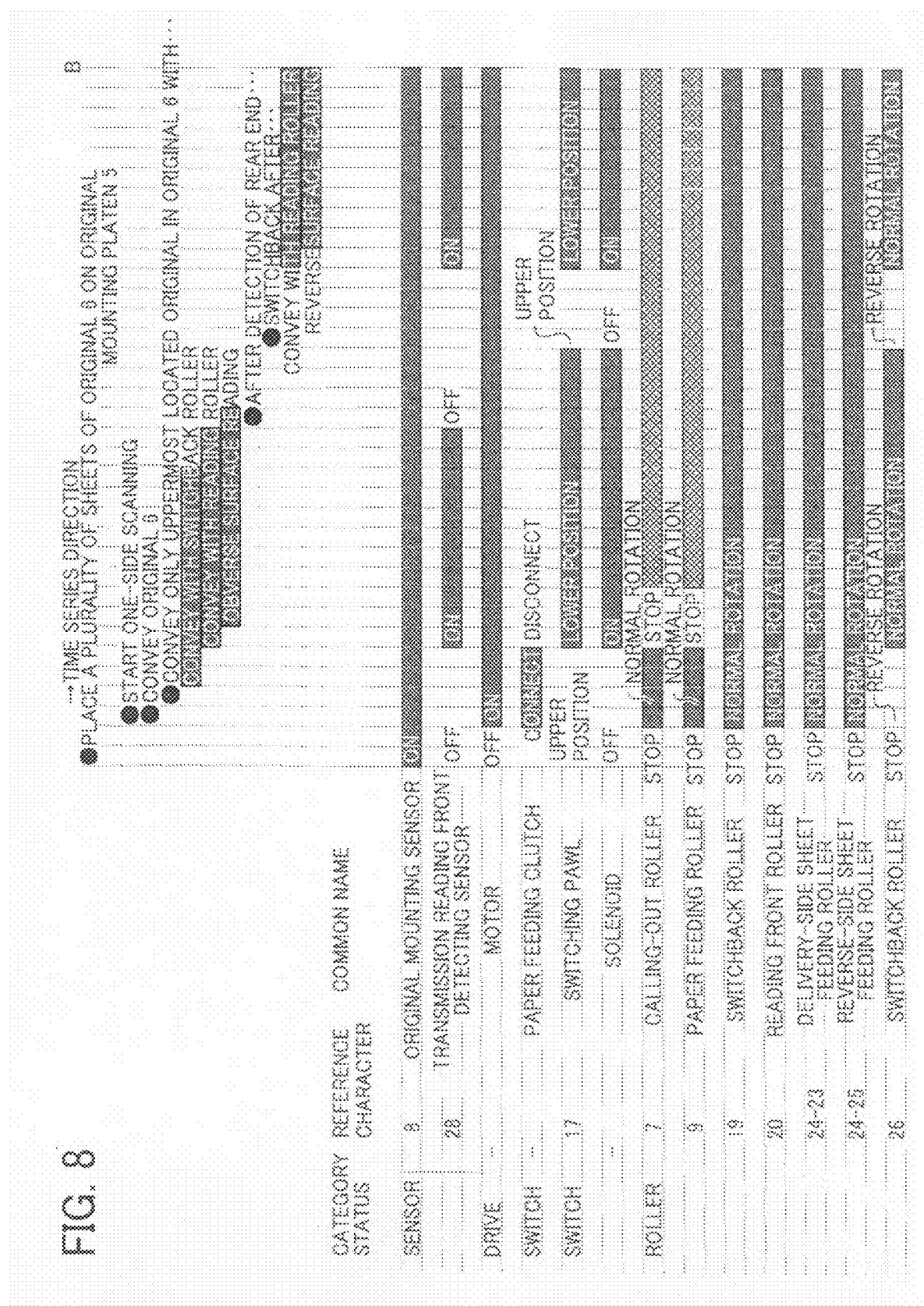
Figure 9:
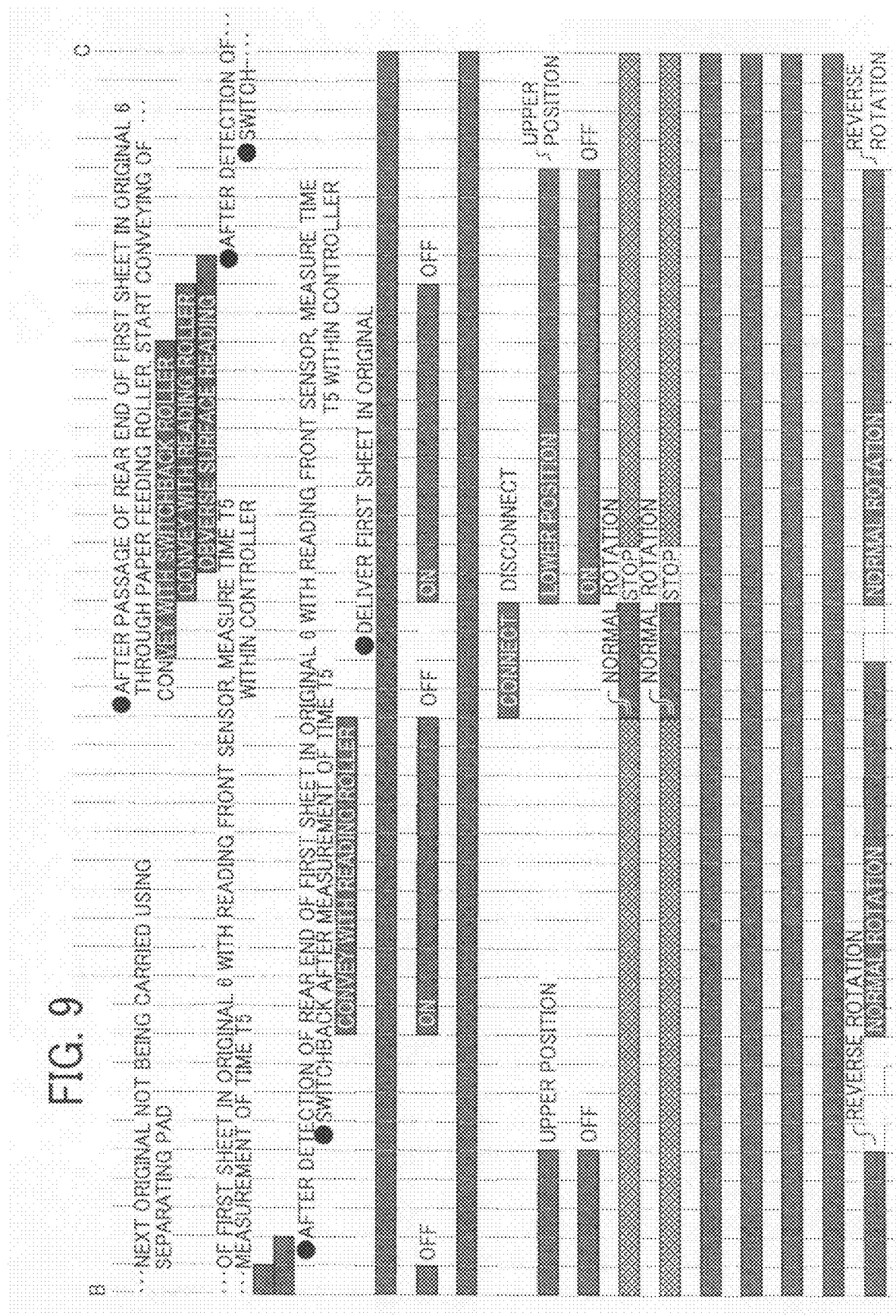
Figure 10:
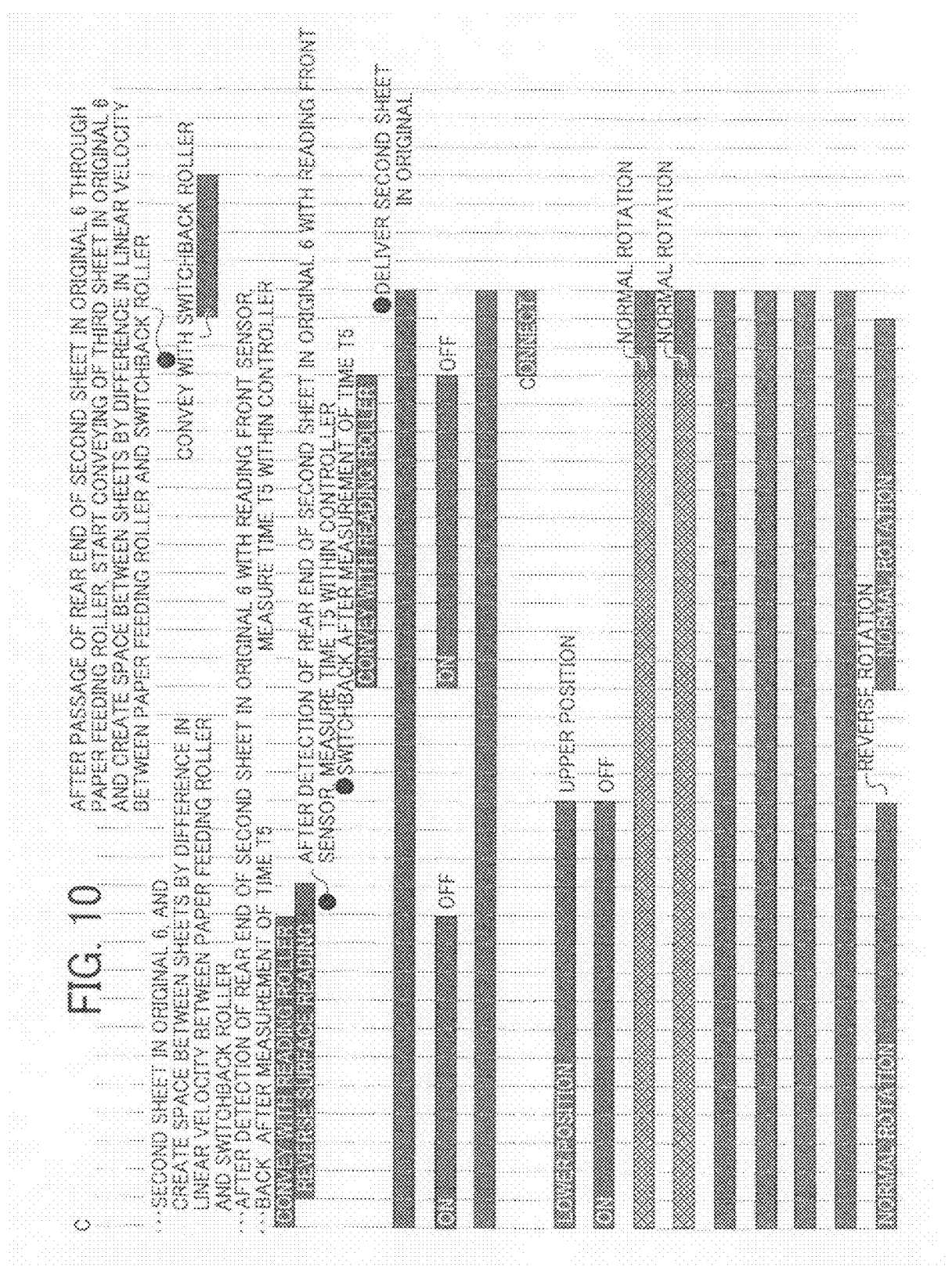

Thus, in the automatic original conveying device according to the second embodiment, when the solenoid is in the on state (FIG. 5A), the switching pawl 17, which functions as the sorting unit, is disposed at the downward position, contributing to power saving. The reason why the power saving is realized is that the original is conveyed to the second conveying path (d) only in double-side scanning and, in one-side scanning, the sorting unit is always located at the upward position, so that the solenoid 60 is in an off state. FIGS. 6 and 7 are timing charts for explaining reading of one side of an original in the automatic original conveying device according to the second embodiment. FIGS. 8 to 10 are timing charts for explaining reading of both sides of an original in the automatic original conveying device according to the second embodiment.

Figure 11:
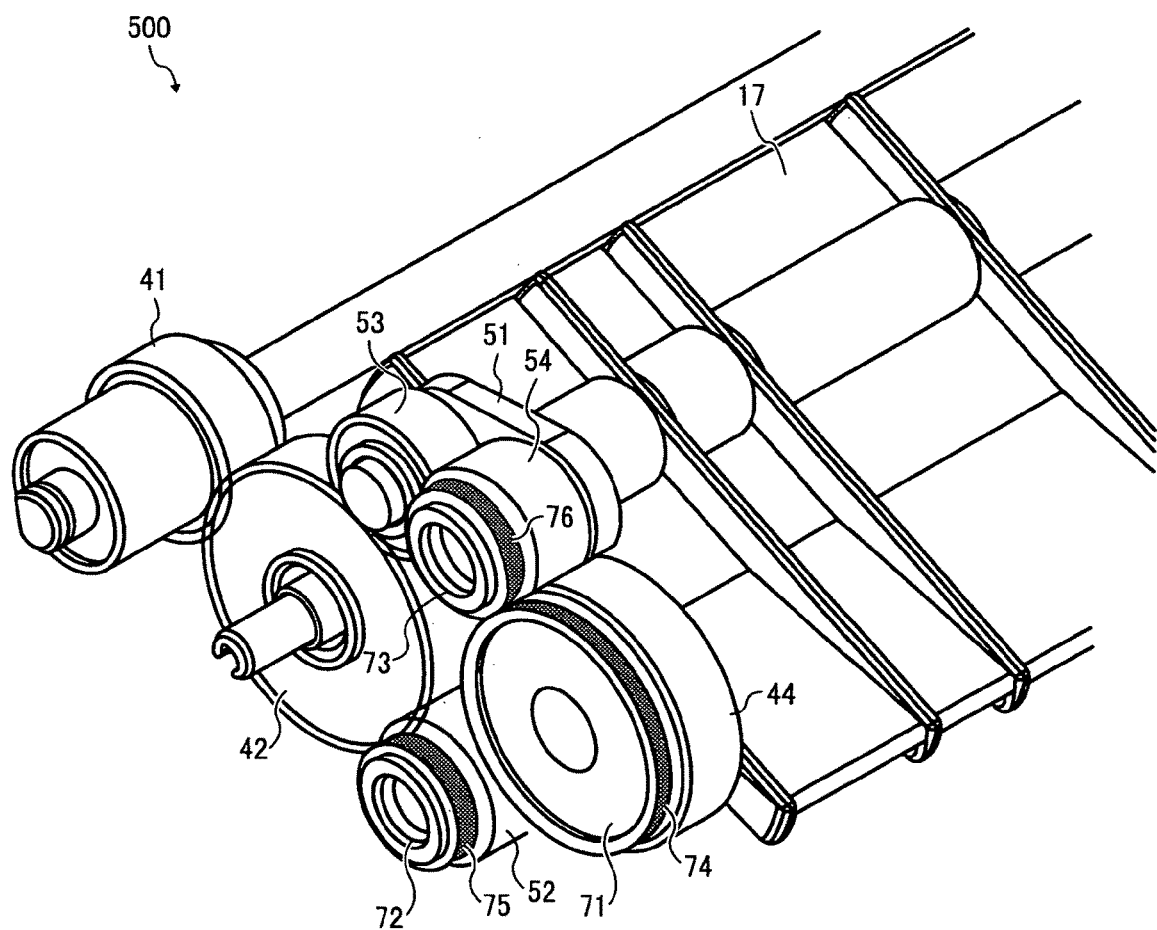
FIG. 11 is a schematic perspective view of a rotation switching mechanism according to a third embodiment of the present invention.

Next, a rotation switching mechanism 500 in an automatic original conveying device according to a third embodiment of the present invention will be explained. FIG. 11 is a schematic perspective view of the rotation switching mechanism 500. In the rotation switching mechanism 500, abutting roller members 71, 72, 73 are disposed respectively on the gears 44, 52, 54. The gears 52 and 54 come into contact with and are separated from the gear 44. The diameters of the abutting roller members 71, 72, 73 are equal respectively to the pitch diameters of the gears 44, 52, 54. Elastic members 74, 75, 76 having a larger outer size than the addendum circles of the gears 44, 52, 54 are provided on a part of the outer circumferential abutting face of the gears 44, 52, 54.

In this manner, the rotation switching mechanism 500 includes the abutting roller members 71, 72, 73. Therefore, as the rotation switching mechanism 500 is driven by a solenoid (such as the solenoid 60) or a coil spring (such as the coil spring 63), the abutting roller members 71, 72, 73 are butted against each other, and, thus, a highly accurate center-to-center distance can be realized. Further, when the abutting roller members 71, 72, 73 come into contact with each other, the elastic members 74, 75, 76 are contacted with each other to initiate the co-rotation of the gear 42, the gear 52, and the gear 54. Therefore, smooth transmission of rotation can be realized. By virtue of this, the direction of rotation of the switchback roller 26 and the like can be switched without decelerating the rotation speed of the motor, and, thus, the efficiency of double-sided original reading can be improved.

The abutting roller members 71, 72, 73 can be configured integrally with the respective gears 44, 52, 54. Accordingly, the number of necessary components can be reduced, contributing to a cost reduction.

According to an aspect of the present invention, in an automatic original conveying device and the image forming apparatus, it is possible to reduce the number of necessary driving sources and realize simplification of control, space saving, and a cost reduction and, at the same time, reduce rattling in rollers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An automatic original conveying device comprising:
an original mounting platen for placing an original;
an original delivery table that is provided downstream of the original mounting platen in an original conveying direction for delivering an original after completion of reading of an original;
a first conveying path that guides an original placed on the original mounting platen to a reading position provided upstream of the original delivery table in the original conveying direction;

a paper delivery path that guides the original in a region between the reading position and the original delivery table;

a switchback conveying path receives the original from the paper delivery path and allows the original to stand by;

a second conveying path that receives the original from the switchback conveying path and guides the original to the first conveying path;

a sheet feeding roller that conveys the original guided by the paper delivery path, and conveys the original that stands by in the switchback conveying path, to the second conveying path;

a sorting unit that sorts the original conveyed from the paper delivery path by the sheet feeding roller as an original to be delivered to the original delivery table or as an original that is allowed to stand by in the switchback conveying path;

a switchback roller that is provided between the sorting unit and the switchback conveying path and that is rotatable in a normal direction or a reverse direction;

a rotation driving source that is rotated in a single direction;

a driving force transmission mechanism that transmits a rotation driving force generated by the rotation driving source from the sheet feeding roller to the switchback roller, the driving force transmission unit includes a rotation switching mechanism that performs switching between rotation in the normal direction and the reverse direction of the switchback roller in conjunction with operation of the sorting unit; and a solenoid member that performs switching of the rotation switching mechanism between the rotation in the normal direction and the reverse direction of the switchback roller by being switched between an energized state and an unenergized state, and when the solenoid member is in the energized state, the rotation switching mechanism rotates and drives the switchback roller in the normal direction so that the original is conveyed to the switchback conveying path.

2. The automatic original conveying device according to claim 1, wherein the driving force transmission unit includes a spaced gear unit comprising a driving gear and a driven gear spaced in a gear train that rotates and drives the switchback roller, the rotation switching mechanism includes a first gear unit comprising an odd number of gears that, when engaged with both the gears in the spaced gear unit, rotate and drive the switchback roller in a first direction;

a second gear unit comprising an even number of gears that, when engaged with both the gears in the spaced gear unit, drive and rotate the switchback roller in a second direction opposite to the first direction; and a drive switching unit that is driven by the solenoid member and engages any one of the first gear unit and the second gear unit with the spaced gears in the geartrain, and when the solenoid member is in the unenergized state, the drive switching unit causes the second gear unit to engage with the spaced two gears.

3. The automatic original conveying device according to claim 2, wherein the drive switching unit is configured integrally with the sorting unit.

4. The automatic original conveying device according to claim 1, wherein the solenoid member is connected to the drive switching unit through an elastic member.

5. The automatic original conveying device according to claim 4, wherein the driving gear in the spaced gear unit, the gear, in the first gear unit, that engages with the driving gear, and the gear, in the second gear, that engages with the driving gear are coaxially provided with respective abutting roller units with diameters that are the same as the diameters of pitch circles in the respective gears.

6. The automatic original conveying device according to claim 5, wherein the abutting roller units are configured integrally with corresponding gears.

7. The automatic original conveying device according to claim 6, further comprising an elastic body arranged in at least a part of outer circumferential surface of each of the abutting roller units.

8. The automatic original conveying device according to claim 4, wherein the drive switching unit is configured integrally with the sorting unit.

9. An image forming apparatus comprising: an automatic original conveying device, the automatic original conveying device including an original mounting platen for placing an original;

an original delivery table that is provided downstream of the original mounting platen in an original conveying direction for delivering an original after completion of reading of an original;

a first conveying path that guides an original placed on the original mounting platen to a reading position provided upstream of the original delivery table in the original conveying direction;

a paper delivery path that guides the original in a region between the reading position and the original delivery table;

a switchback conveying path receives the original from the paper delivery path and allows the original to stand by;

a second conveying path that receives the original from the switchback conveying path and guides the original to the first conveying path;

a sheet feeding roller that conveys the original guided by the paper delivery path, and conveys the original that stands by in the switchback conveying path, to the second conveying path;

a sorting unit that sorts the original conveyed from the paper delivery path by the sheet feeding roller as an original to be delivered to the original delivery table or as an original that is allowed to stand by in the switchback conveying path; and a switchback roller that is provided between the sorting unit and the switchback conveying path and that is rotatable in a normal direction or a reverse direction;

a rotation driving source that is rotated in a single direction;

a driving force transmission mechanism that transmits a rotation driving force generated by the rotation driving source from the sheet feeding roller to the switchback roller, the driving force transmission unit includes a rotation switching mechanism that performs switching between rotation in the normal direction and the reverse direction of the switchback roller in conjunction with operation of the sorting unit; and a solenoid member that performs switching of the rotation switching mechanism between the rotation in the normal direction and the reverse direction of the switchback roller by being switched between an energized state and an unenergized state, and when the solenoid member is in the energized state, the rotation switching mechanism rotates and drives the switchback roller in the normal direction so that the original is conveyed to the switchback conveying path.

* * * * *